United States Patent [19]
Bommarito

[11] Patent Number: 5,321,906
[45] Date of Patent: Jun. 21, 1994

[54] FISHING SCENT DELIVERY SYSTEM

[76] Inventor: Alexander A. Bommarito, 12555 W. Freeland Rd., Freeland, Mich. 48623

[21] Appl. No.: 85,160
[22] Filed: Jul. 2, 1993
[51] Int. Cl.$^5$ ............................................. A01K 97/04
[52] U.S. Cl. ................................... 43/44.99; 43/42.06
[58] Field of Search ............................. 43/42.06, 44.99

[56] References Cited

U.S. PATENT DOCUMENTS

| | | | |
|---|---|---|---|
| 2,583,660 | 1/1952 | Moore | 43/44.99 |
| 2,968,886 | 1/1961 | Cotroumpas | 43/44.99 |
| 3,798,823 | 3/1974 | Watters | 43/44.99 |
| 3,969,840 | 7/1976 | Charron | 43/42.06 |
| 3,991,504 | 11/1976 | Pieper | 43/42.06 |
| 4,602,453 | 7/1986 | Polley | 43/42.06 |
| 4,763,434 | 8/1988 | Horneff | 43/44.99 |
| 4,888,907 | 12/1989 | Gibbs | 43/42.06 |
| 4,977,854 | 12/1990 | Marrs | 43/44.99 |

FOREIGN PATENT DOCUMENTS 1241531 8/1971 United Kingdom ............... 43/44.99

*Primary Examiner*—Kurt C. Rowan
*Attorney, Agent, or Firm*—Merlin B. Davey

[57] ABSTRACT

This invention provides a fishing scent delivery system comprising an inflatable bladder, a means for instilling a fishing scent material in said bladder under pressure and a means for allowing said fishing scent material to be released in the vicinity of a fishing lure at a desired, controlled rate.

4 Claims, 2 Drawing Sheets

1

FISHING SCENT DELIVERY SYSTEM

BACKGROUND OF THE INVENTION

Fishing techniques have developed from the use of live bait to the use of many different types of artificial lures. Recently, a number of scents have been manufactured to address the highly developed sensory system in fish. The presently employed application techniques use active diffusion or runoff from artificial lures and do not provide a positive continuous release. The bait or lure must be repeatedly sprayed or painted to keep the scent on the bait, as the scent is rapidly lost in running water or from active baits. A recent development has been the use of a pouch to hold the scent longer.

SUMMARY OF THE INVENTION

The present invention provides an active fishing scent release or delivery system comprising an inflatable bladder, a means for instilling a fishing scent material in said bladder under pressure and a means for allowing said fishing scent material to be released in the vicinity of a fishing lure at a desired, controlled rate.

DETAILED DESCRIPTION OF THE INVENTION

The invention is further understood by reference to the accompanying drawings wherein.

Figure 1:
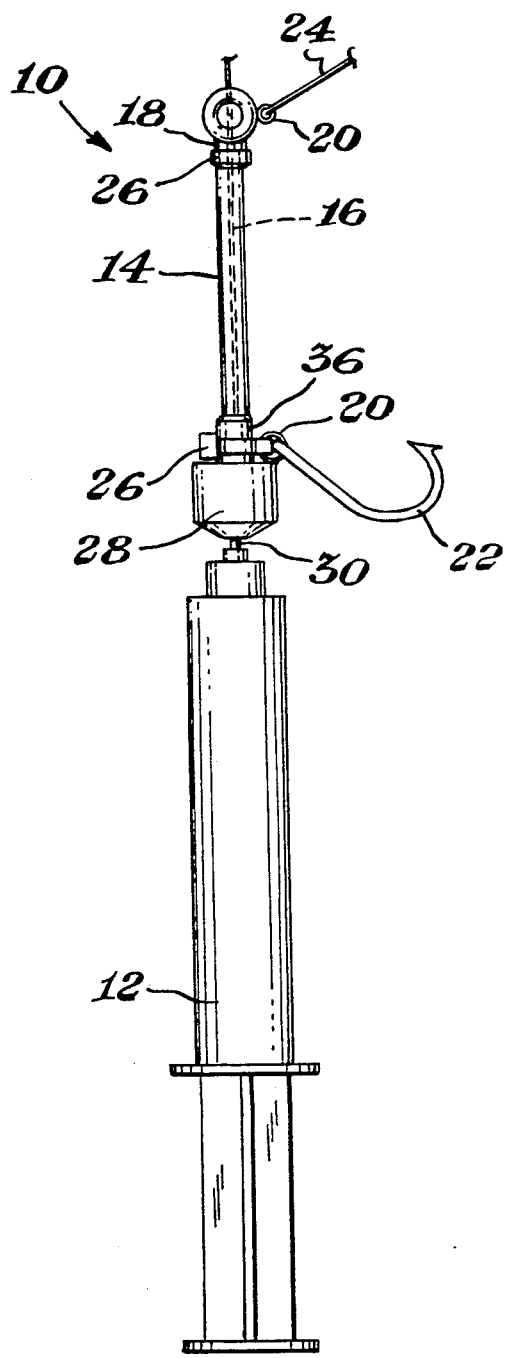
FIG. 1 is a representation of one embodiment of a fishing jig in accordance with the present invention illustrating one means of instilling a fishing scent material into a fishing scent delivery system in accordance with the present invention.
Figure 2:
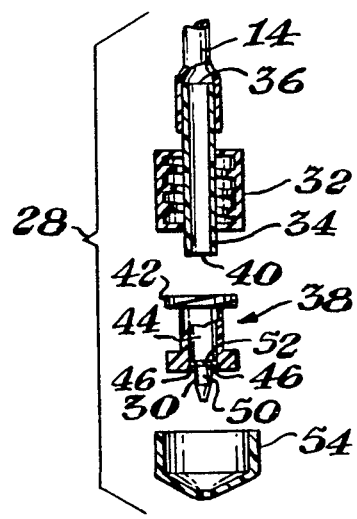
FIG. 2 is an exploded, sectional view of one embodiment of an IN - OUT port employed in accordance with the present invention.

Referring to FIG. 1, a fishing scent delivery system 10 in accordance with one embodiment of the present invention is shown fitted to a standard syringe 12 via an IN - OUT port 28 through a pressure fitting 30 such as further illustrated in FIG. 2. Bladder 14 is shown in the empty condition. Wire 16 passes through bladder 14, plug 18 and end 36 of IN - OUT port 28 to connectors 20 for connecting to fish hook 22 and line 24. Bladder 14 may be made of various flexible, rubbery materials such as, for example, silicones, latex rubbers, natural rubbers, Kraton (Reg. TM) and the like. Bladder 14 is securely attached to plug 18 and end 36 of IN - OUT port 28 by, for example, clamps or wires 26 or a water-insoluble adhesive as desired.

In FIG. 2, IN - OUT port 28 is seen to comprise an internally, circumferentially threaded hollow cylinder 32 enclosing a centrally disposed tube 34 extending out both ends of cylinder 32, said tube 34 having a first end 36 adapted to securely engage bladder 14 and a second end 40 adapted to fit into valve housing 38. Valve housing 38 comprises a hollow cylindrical portion 44 having internal shoulders 46, pressure fitting 30 and flange 42, said flange 42 being adapted to operatively engage threaded cylinder 32. Pressure fitting 30 comprises or defines passageway 50. Valve means 52 are adapted to fit onto shoulders 46 and provide a controlled and controllable filtering means between tube 34 and passageway 50. Tube 34 is adapted to extend into valve housing 38 when said valve housing is threaded into cylinder 32 such that end 40 of tube 34 presses against valve means 52 on shoulders 46 and holds said valve means in secure position. IN - OUT port 28 may be covered with a cap 54 as shown.

Valve means 52 may comprise a filter system such as, for example, fibrous materials such as cotton balls, cloth, and paper products. Also, expanded plastics materials may be employed, expanded polytetrafluroethylene being a particularly desirable material. Other materials such as, for example, nylon, polyesters, cellulose esters and polycarbonates may also be employed, it being only necessary that they be essentially water-insoluble and environmentally acceptable filter materials.

Figure 3:
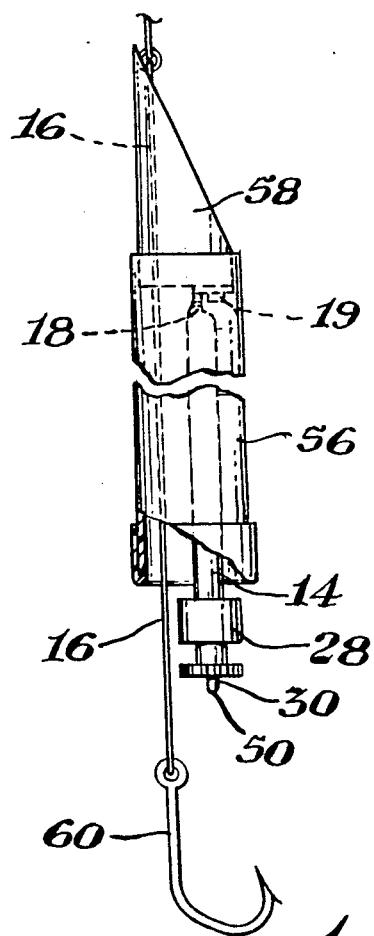
FIG. 3 is an illustration of employing a fishing scent delivery system of this invention with a fishing plug.

In FIG. 3 an embodiment of a fishing scent delivery system in conjunction with a fishing plug in accordance with this invention is shown. The fishing scent delivery system is shown disposed within a protective sheath, or cylinder 56. Steel wire 16 passes through plug 58 and cylinder 56 directly to a fish hook 60 or a fishing lure. The scent delivery system is disposed within the protective sheath 56 and is attached to plug 58 but IN - OUT port 28 extends beyond sheath 56 for ready access in adding more scent as needed. Bladder 14 may be closed at one end by plug 18 and may be fastened to plug 58 by bolt or screw 19.

Figure 4:
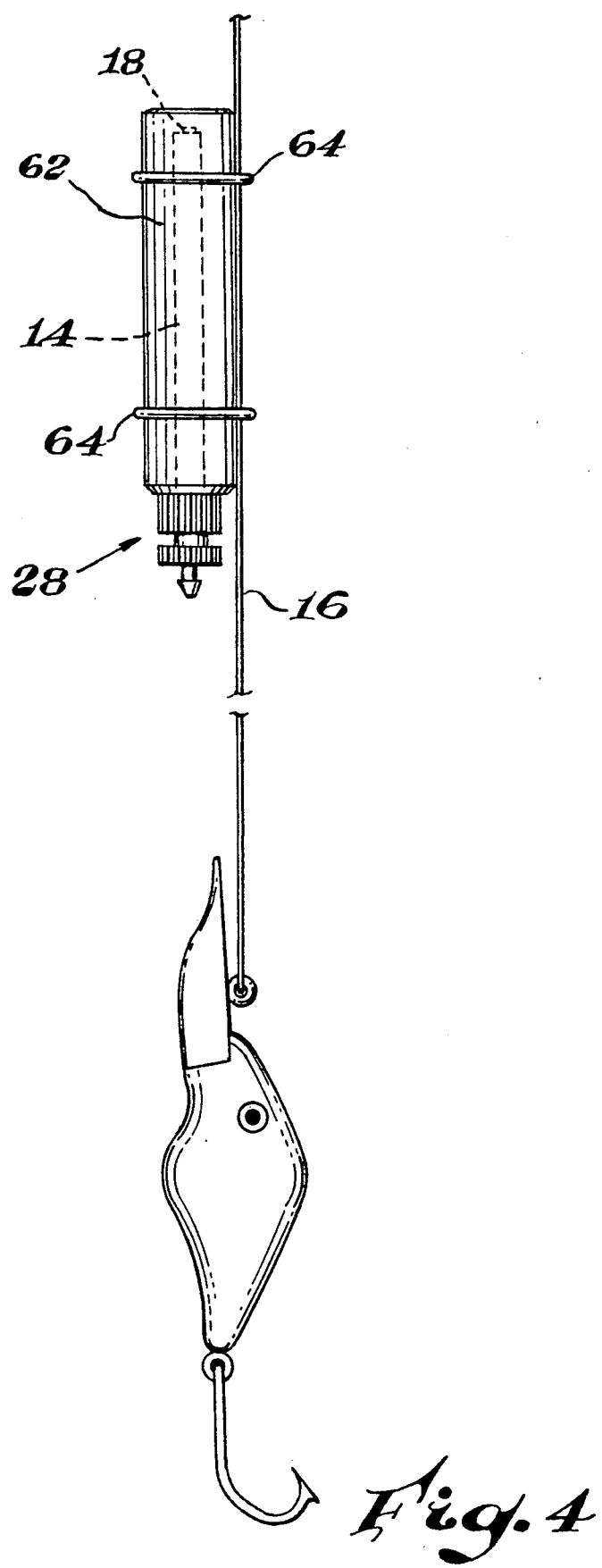
FIG. 4 is an illustration of one means of attaching a fishing scent delivery system of the invention to a fishing line such that the fishing scent will be dispensed to pass around a fishing lure.

FIG. 4 illustrates the attachment of a fishing scent delivery system in accordance with the present invention to a fish line forward of a fishing lure. As shown in FIG. 4, the bladder portion of a fishing scent delivery system in accordance with this invention is enclosed within a cylindrical shell 62 while IN - OUT port 28 extends beyond said shell 62. Shell or protective covering 62 may be decorated, such as with a shiny or brightly colored plastics or metal foil to serve as an additional attractant to fish. The system of FIG. 4 may be attached to a fish line by means of rubber bands (64), or otherwise as fishermen are apt to do.

The various parts of a fishing scent delivery system in accordance with the present invention may be made of various synthetic plastics or natural materials that are essentially water-insoluble and have the desired strength and flexibility or rigidity to perform their desired function as described.

In operation of the fishing scent delivery system (FIG. 1) in accordance with the embodiment shown, syringe 12 is filled with the desired scent material and attached to pressure fitting 30. Valve housing 38 (FIG. 2) is loosened such that end 40 of tube 34 does not tightly compress valve means 52, and the desired amount of scent material is forced into bladder 14. Syringe 12 is removed and valve housing 38 is tightened to the desired drip rate of the scent material by screwing into cylinder 32.

In a typical embodiment of the present invention, valve means 52 may comprise STERISHEET 100 (Reg. TM) operating room drape material about 1.5 inch long and 3/16 inch wide is folded lengthwise on itself several times so that it forms a plug adapted to fit onto shoulders 46 of IN - OUT port valve housing 38. Hollow cylindrical portion 44 advantageously has an internal diameter of about 175 thousandths, passageway 50 advantageously has an internal diameter of about 160 thousandths. The fit between end 40 of tube 34 and cylindrical portion 44 is snug, i.e., a difference of about 2 thousandths between the outside diameter of tube 34 and inside diameter of cylindrical portion 44 being typical. Employing a bladder 14 that will contain about 10 cc. of scent material valve means 52 will advantageously provide a substantially uniform drip rate of 10 to 20 drops per minute and will cause the scent material to last for about 40 minutes which will keep the hook and fishing lure bathed in a desired fish attractant. The pressure in bladder 14 when filled is advantageously below 30 psi.

Various modifications may be made in the present invention without departing from the spirit or scope thereof as will be apparent to those skilled in the art.

I claim:

1. A fishing scent delivery system comprising an inflatable bladder, a means for instilling a fishing scent material in said bladder under pressure and a means for allowing said fishing scent material to be released in the vicinity of a fishing lure at a desired, controlled rate, wherein the means for instilling fishing scent material into said bladder comprise an internally, circumferentially threaded hollow cylinder having a first end and a second end and enclosing a centrally disposed tube extending out both ends of said cylinder and affixed to said cylinder, said tube having a first end adapted to engage said bladder and a second end adapted to fit into a valve housing, said valve housing comprising a hollow cylindrical portion having internal shoulders, a flange adapted to operatively engage said threaded cylinder, said valve housing terminating in a pressure fitting having a centrally disposed passageway connecting with said hollow cylindrical portion.

2. System of claim 1 including a filter material positioned on said internal shoulders of said valve housing.

3. System of claim 2 wherein the flow rate of scent delivery is controlled by adjusting the pressure on said filter material.

4. System of claim 1 that is adapted to be attached to a fishing line forward of a fishing lure so that the released scent passes around the lure when fishing.

* * * * *